(12) United States Patent
Nagami et al.

(10) Patent No.: US 10,988,305 B2
(45) Date of Patent: Apr. 27, 2021

(54) POWDER FEEDING APPARATUS AND METHOD THEREOF

(71) Applicant: DENSO CORPORATION, Kariya (JP)

(72) Inventors: Yukihisa Nagami, Kariya (JP); Takashi Deguchi, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 323 days.

(21) Appl. No.: 16/079,571

(22) PCT Filed: Feb. 7, 2017

(86) PCT No.: PCT/JP2017/004425
§ 371 (c)(1),
(2) Date: Aug. 24, 2018

(87) PCT Pub. No.: WO2017/145744
PCT Pub. Date: Aug. 31, 2017

(65) Prior Publication Data
US 2019/0055079 A1   Feb. 21, 2019

(30) Foreign Application Priority Data
Feb. 25, 2016  (JP) .............................. JP2016-034439

(51) Int. Cl.
*B65D 83/06* (2006.01)
*B23K 10/02* (2006.01)
(Continued)

(52) U.S. Cl.
CPC .............. *B65D 83/06* (2013.01); *B05B 7/144* (2013.01); *B23K 10/02* (2013.01); *B26D 1/00* (2013.01); *G07F 13/00* (2013.01); *B05B 7/226* (2013.01)

(58) Field of Classification Search
CPC ......... B65D 83/06; B05B 7/144; B05B 7/226; G07F 13/00; B26D 1/00; B65G 65/48;
(Continued)

(56) References Cited

U.S. PATENT DOCUMENTS 1,844,172 A * 2/1932 Moore ..................... F23K 3/00
  406/68
2,812,883 A * 11/1957 Hayford ............. G03G 15/0803
  222/630
(Continued)

FOREIGN PATENT DOCUMENTS

JP          2653531 B2     9/1997

*Primary Examiner* — Patrick M. Buechner
*Assistant Examiner* — Randall A Gruby
(74) *Attorney, Agent, or Firm* — Harness, Dickey & Pierce, P.L.C.

(57) ABSTRACT

A powder feeding apparatus drops powder from a tank storing the powder to an oblique portion, and accumulates the powder on a plate disposed below the oblique portion. The plate is provided with a flat surface portion and a groove portion which is inverted from the flat surface portion to a lower part. The scraper moves powder which has accumulated to a higher level than a constant height on the flat portion and the groove portion, to an outer-side of the flat portion and smoothes the powder on the flat portion and the groove portion to a constant height. An ejector takes in powder which has accumulated on the groove portion of the plate by a suction opening, disposed at a front side of the scraper, in a relative moving direction of the plate, and discharges the powder from the discharge opening.

20 Claims, 6 Drawing Sheets

(51) Int. Cl.
  *B05B 7/14* (2006.01)
  *B26D 1/00* (2006.01)
  *G07F 13/00* (2006.01)
  *B05B 7/22* (2006.01)

(58) Field of Classification Search
  CPC ............ B65G 65/4809; B65G 65/4818; B65G 65/4836; B65G 65/4845; B65G 65/4854; B65G 65/4872
  See application file for complete search history.

(56) References Cited

U.S. PATENT DOCUMENTS

| | | | | |
|---|---|---|---|---|
| 2,878,972 | A * | 3/1959 | Matthews | G03G 15/0803 222/630 |
| 3,648,901 | A * | 3/1972 | Cade | G03G 15/0803 406/63 |
| 4,165,822 | A * | 8/1979 | Jaudt | B65G 65/4881 222/636 |
| 4,789,569 | A * | 12/1988 | Douche | G01F 13/001 427/180 |
| 5,273,584 | A * | 12/1993 | Keller | B05B 7/144 118/308 |
| 5,615,830 | A * | 4/1997 | Matsunaga | B05B 5/1683 222/368 |
| 6,129,037 | A * | 10/2000 | Watts | A21C 9/04 118/13 |
| 6,615,902 | B1 * | 9/2003 | Nishikawa | B22D 17/14 164/267 |
| 6,651,843 | B2 * | 11/2003 | Kowalsky | B05B 7/144 222/1 |
| 6,735,278 | B2 * | 5/2004 | Madsen | G01N 33/383 378/79 |
| 8,403,188 | B2 * | 3/2013 | Platsch | G01F 11/24 222/636 |
| 10,654,667 | B2 * | 5/2020 | Orban | B65G 65/425 |
| 10,737,890 | B2 * | 8/2020 | Mallaley | F16J 15/164 |
| 10,800,615 | B2 * | 10/2020 | Coward | B65G 65/4827 |
| 2011/0318483 | A1 * | 12/2011 | Toncelli | B28B 1/005 427/197 |
| 2013/0019970 | A1 * | 1/2013 | Kleineidann | B05B 7/1472 137/565.01 |
| 2017/0209920 | A1 * | 7/2017 | Saida | B22D 17/32 |
| 2020/0038888 | A1 * | 2/2020 | Van Den Heuvel | G02F 1/1303 |

* cited by examiner

POWDER FEEDING APPARATUS AND METHOD THEREOF

CROSS REFERENCE TO RELATED APPLICATIONS

This application is a U.S. National Phase Applications under 35 U.S.C. 371 of International Application No. PCT/JP2017/004425 filed on Feb. 7, 2017 and published in Japanese as WO/2017/145744 A1 on Aug. 31, 2017. This application is based on and claims the benefit of priority from Japanese Patent Application No. 2016-034439 filed on Feb. 25, 2016. The entire disclosures of all of the above applications are incorporated herein by reference.

TECHNICAL FIELD

The present invention is related to a powder feeding apparatus and a powder feeding method. More specifically, the present invention relates to a powder feeding apparatus provided with a cutter plate that cuts a top surface of powder which has accumulated to a uniform level and a power feeding method that uses such a cutter plate.

BACKGROUND

There is known a conventional powder feeding apparatus which feeds powder to a processing object.

Japanese Patent Literature 1 discloses a powder feeding apparatus in which powder is dropped on to a rotating plate from a through hole provided on the bottom of a tank which stores the powder. After a top surface of the powder accumulated on an accumulation surface of the rotating plate is cut to a constant height using a cutter plate, the powder is then discharged from a discharge opening provided on an outer periphery of the rotating plate.

The powder feeding apparatus may thus continuously provide powder, in relation to the processing object, from the discharge opening of the rotating plate.

PRIOR ART LITERATURE

Patent Citations

Solution to Problem

However, according to the powder feeding apparatus of the JPT-1, the rotating plate is configured with a conical projection disposed at in an inner side in a radial direction of the accumulation surface, and an outer guide disposed at an outer side in the radial direction of the accumulation surface. As a consequence, a situation may arise in which powder which has accumulated on the rotating plate is pressed on the accumulation surface, the projection, the outer guide and the cutter plate during a rotating operation of the rotating plate, and the powder thus compressed as a result.

In this case, even if the top surface of the powder is uniformly cut to a constant height by the cutter plate, variation in a density of the powder will occur, thus, increased variation in the quantities of the powder discharged from the discharge opening may also occur.

In addition, since this powder feeding apparatus is equipped with the accumulation surface and the bottom surface of the cutter plate mounted at a fixed distance, with an exception of adjusting the rotating speed of the rotating plate, a means of changing a discharged quantity of the powder discharged from the discharge opening is not provided.

The powder feeding apparatus disclosed in JPT-1 is configured with only one discharge opening for the powder, which is provided on the outer periphery of the rotating plate. As a result, when powder material for a plurality of processing objects is supplied, a number of powder material feeding apparatuses corresponding to the number of the plurality of processing objects are also required.

In this regard, issues of an increase in the size of equipment which has a plurality of powder feeding apparatuses and an increase in the manufacturing costs become a concern.

SUMMARY

In view of the above issues, the present invention aims to provide a powder feeding apparatus and a method thereof which can discharge stable quantities of powder with little variation between the quantities.

A first aspect of the present disclosure is a powder feeding apparatus equipped with a tank, a bottom plate, an oblique section, a plate, a scraper and an ejector. The tank stores powder material. The bottom plate is disposed on a bottom of the tank and is provided with through holes into which the powder passes through. The oblique portion is formed on a lower side of the through holes of the bottom plate such that an outer radius gradually increases from a bottom plate-side towards a lower side. The plate has a flat surface portion extending along an outer periphery of a lower-end portion of the oblique portion, and a groove portion that is inverted to a lower part from the flat surface portion. The powder which drops along an outer wall of the oblique portion is received by the plate.

The scraper is moveable relative to the plate. The scraper moves the powder which accumulates on top of the flat portion and the groove to a level that is higher than a constant height, to an outer side of the flat surface portion, and also levels the accumulated powder on the flat portion and the groove uniformly to a constant height. The ejector is provided with a suction opening which takes in the powder accumulated in the groove portion of the plate positioned at a front-side in relation to the scraper in the relative moving direction, and a discharge opening which discharges the powder taken in from the suction opening. The ejector is moveable relative to the scraper and the plate.

Since the scraper moves the powder that has accumulated on the flat portion and the groove portion to a higher level than a fixed height, to an outer-side of the flat portion, the powder which has accumulated on the flat portion and the groove portion is smoothed to a uniform height without being compressed, and gathered inside the groove portion at a substantial constant density.

As a result, the powder feeding apparatus can take in the powder at the suction opening of the ejector, and discharge the powder from the discharge opening, to provide stable quantities of powder having a small difference between each volume.

A second aspect of the present invention is a powder feeding method. The powder feeding method includes a storage step, a dropping step, a cut and smoothing to uniform level step and a discharging step.

In the dropping step, the powder is dropped from the through holes (16) of the bottom plate provided on the bottom of the tank (10) to the outside wall of the oblique portion (40) which is provided on a lower side of the through holes (16).

In the cut and smoothing to a uniform level step, powder which has been dropped along the outside wall of the oblique portion (40) and accumulates to a higher level than a fixed height on the flat portion (51) and the groove portion (52) is moved by the scraper (80) to the outside of the flat surface portion (51), and the powder which has accumulated on the flat surface (51) and the groove portion (52) is then uniformly smoothed to a constant height.

In the discharging step, the plate (50) and the ejector (72) move relative to each other, and powder which has accumulated in the groove portion (52) of the plate (50) is taken-in by the suction opening (74) of the ejector (72), and then discharged from the discharge opening (75).

Since the scraper (80) moves powder which has accumulated to a level which is higher than the fixed height on the flat portion (51) and the groove portion (52), to the outerside of the flat portion (51) during the cut and smoothing to uniform level step, the powder accumulated on the flat portion (51) and the groove portion (52) is not compressed. As a result, the powder is smoothed to the same height, and accumulated at a constant density inside of the groove portion (52). According to the powder feeding method described, powder material is thus taken in from the suction entrance (74) of the ejector (72) and stable quantities of the powder with small a difference in quantities may be discharge from the discharge opening.

BRIEF DESCRIPTION OF DRAWINGS

In the accompanying drawings.

EMBODIMENTS

Embodiments of the present invention will be described hereinafter, with reference to the figures.

First Embodiment

A first embodiment of the present invention is exemplified in FIGS. 1 to 8. A powder feeding apparatus 1 of the present embodiment is an apparatus which continuously supplies stable quantities of powder in relation to a processing object 2, for example, a metallic board material (refer to FIG. 7). A flux powder which is used in thermal spraying is an example of a powder which may be supplied by the powder feeding apparatus 1.

Figure 1:
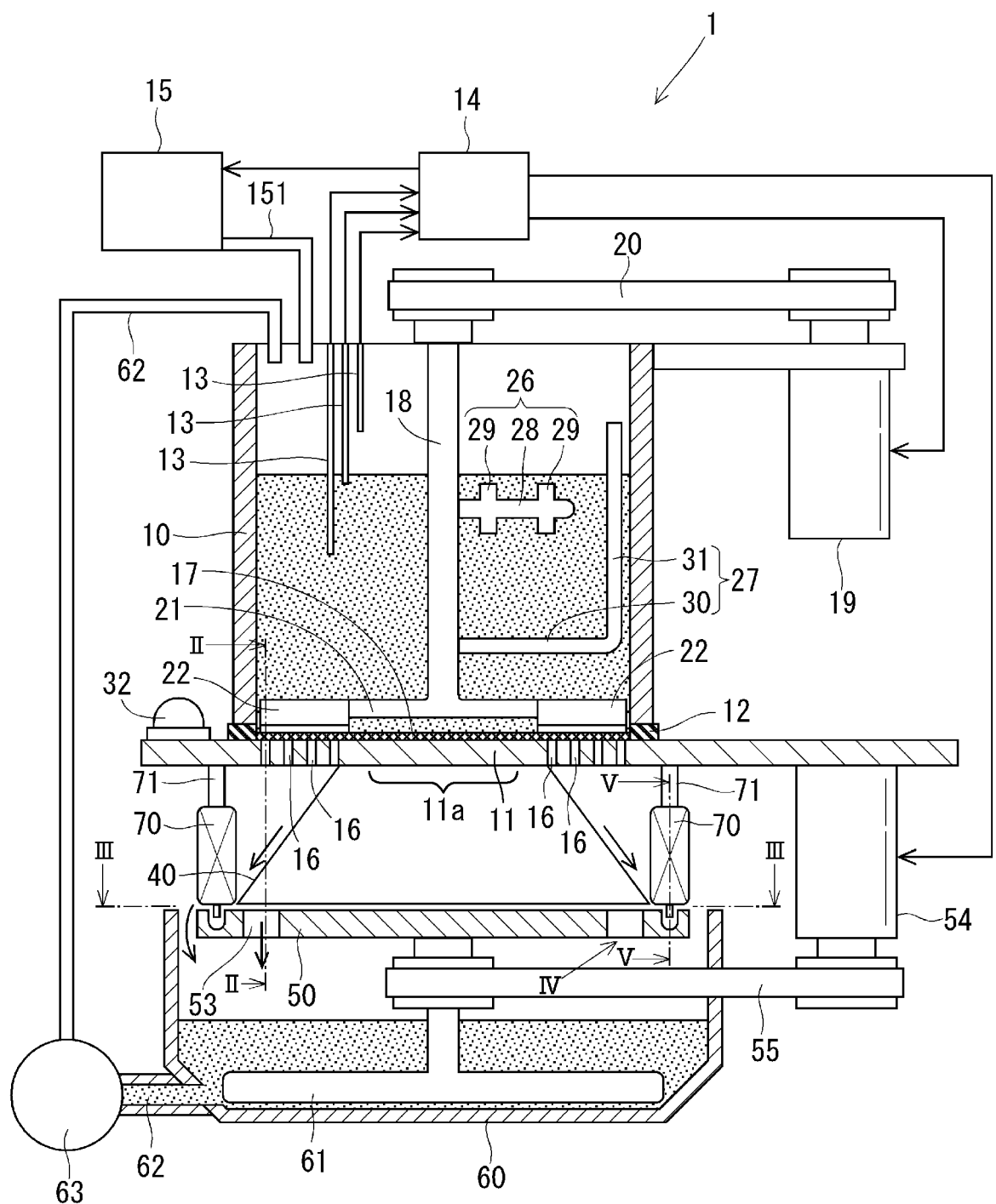
FIG. 1 is a cross sectional view of a powder Feeding apparatus according to a first embodiment of the present invention.

As shown in FIG. 1, the powder feeding apparatus 1 is provided with a tank 10, a bottom board 11, an oblique portion 40, a plate 50 and a powder discharging member 70, for example. The tank 10 is formed in a columnar shape. The bottom board 11 is provided on a bottom of the tank 10. A packing 12 formed of a circular elastic material is provided between the tank 10 and the bottom board 11. As a result, the tank 10 may store the powder inside the tank 10.

A sensor 13 which detects an amount of powder is provided on the inside of the tank 10. A signal of the sensor 14 is transmitted to a control apparatus 14. The control apparatus 14 supplies the powder to the tank 10 through a pipe 151 from a powder storage section 15, when a quantity of the powder which is stored in the tank 10 is less than a fixed amount.

The bottom board 11 provided on the bottom of the tank 10 has a plurality of through holes 16 that enables powder to pass through the bottom board 11. The plurality of through holes 16 are arranged in regions which correspond to an outside wall in an outer radial direction of the oblique portion 40 which is provided below the bottom board 11. The plurality of through holes 16 are arranged in regions other than locations in which the powder discharging members 70 are provided.

Figure 2:
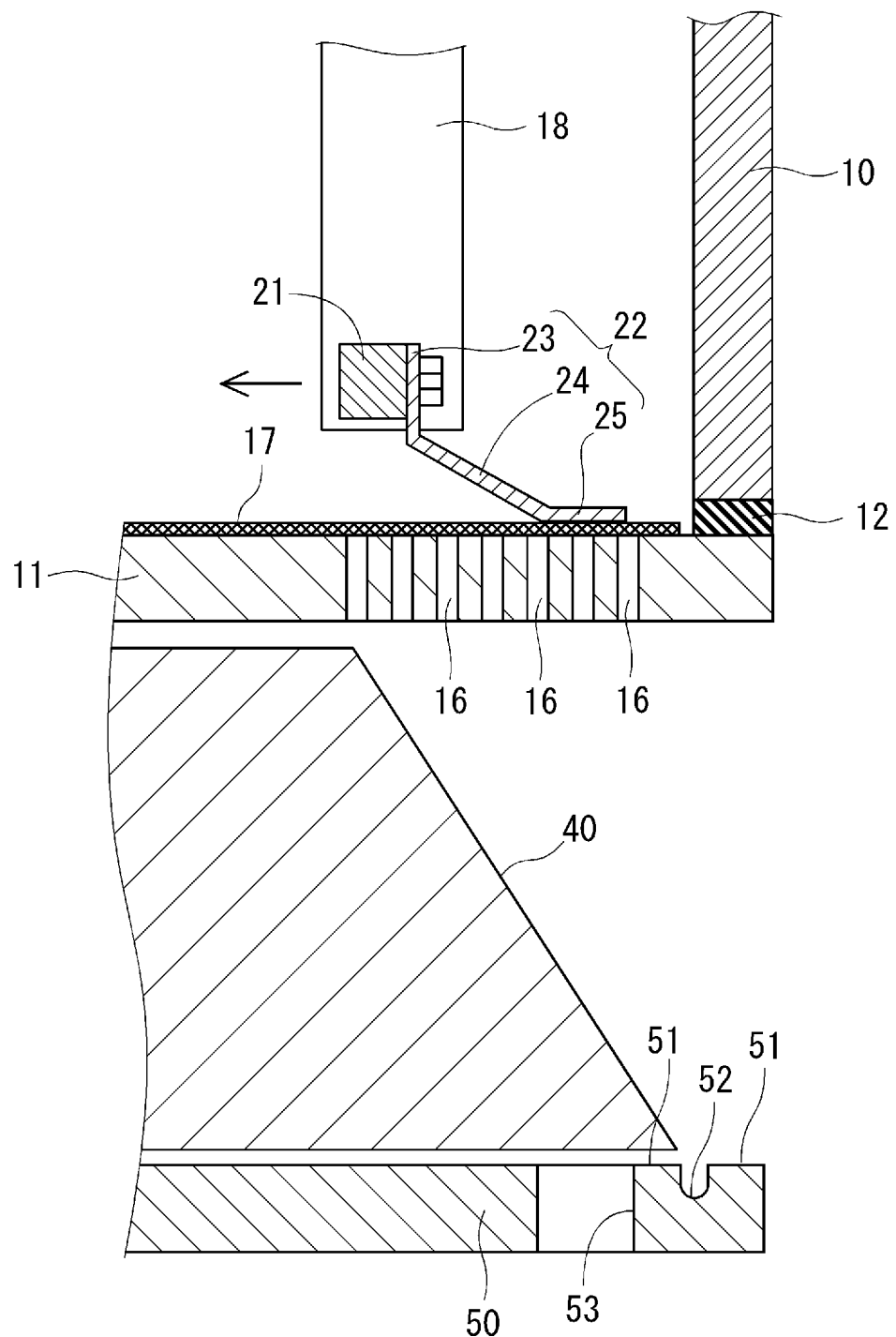
FIG. 2 is a cross sectional view of along a line II-II of FIG. 1.

As shown in FIG. 1 and FIG. 2, a net section 17 is provided on the bottom board 11. The net section 17 is disposed to cover the through holes 16 of the bottom board 11. A shaft 18 is provided on the inside of the tank 10. When torque generated at a first monitor 19 which corresponds to the shaft 18 is transmitted via a belt 20, the shaft 18 rotates around an axis.

It is noted that the first monitor 19 and the shaft 18 may be driven directly connected thereto, that is, without going through the belt 20.

An arm 21 is provided to extend from an end of the shaft 18 in a radial direction. Plate spring members 22 are fixed to the arm 21. Each of the plate spring member 22 is integrated with an attachment 23 attached to the arm 21, an oblique portion which obliquely extends from the attachment 23 to a rear side in the rotating direction of the arm 21, and also a sliding contact member 25. The sliding contact member 25 contacts a surface or contacts a line in relation to the net member 17. Once the shaft 18 rotates around the axis, the sliding contact member 25 provided with the plate spring member 22 moves on the net section 17 whilst being in sliding contact with the net portion 17.

A first mixing rod 26 and a second mixing rod 27 are provided fixedly on the shaft 18 along an axial direction thereof such that the rods extend from two different axial points and are excluded from both axial ends of the shaft 18. The first mixing rod 26 is provided with a stalk portion 28 that extends in the radial direction from an outer wall of the shaft 18 and bud portions 29 on an outer wall of the stalk member 28. The second mixing rod 27 is provided with a first arm member 30 which extends outwards in a radial direction of the shaft 18 from the outer wall of the shaft 18, and a second arm 31 which extends along an inner wall of the tank 10 from an end of the first arm 30. Once the shaft 18 rotates around the axis, the first mixing rod 26 and the second mixing rod 27 also rotate on an inside of the tank 10 and powder inside the tank 10 is mixed.

A vibration generator 32 is attached on an outside of the tank 10, on the bottom board 11. The vibration generator 32 vibrates which in turn can vibrate bottom board 11.

Figure 3:
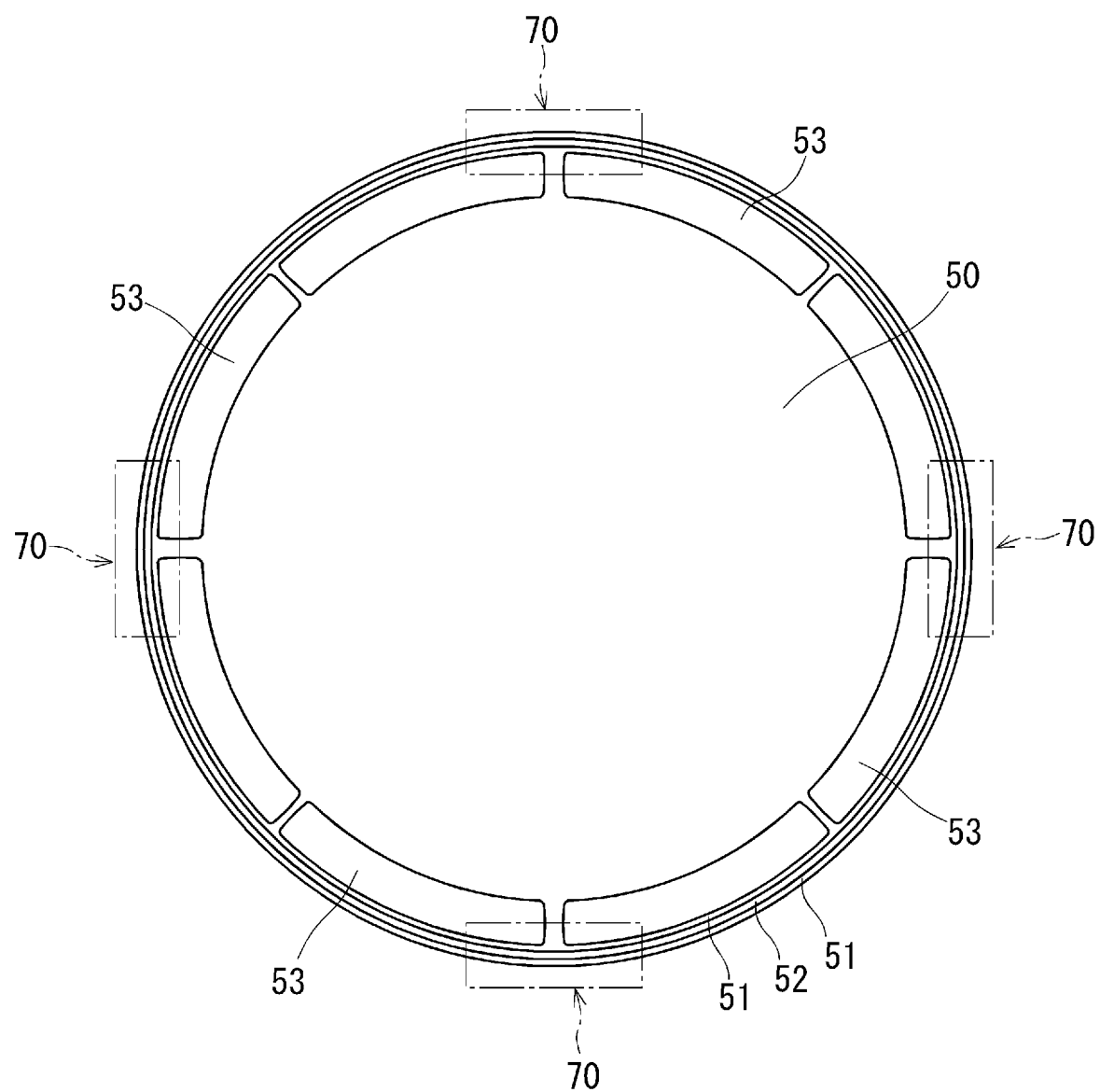
FIG. 3 is a cross sectional view along a line III-III of FIG. 3.

An oblique portion 40 is provided below the bottom board 11. The oblique portion 40 formed in a prism shape with a tip portion cut to provide a horizontal flat surface with an outer radius gradually increasing in size from the bottom board 11 to a lower-side thereof. As shown in FIG. 1 to FIG. 3, the plate 50 is provided below the bottom board 11. The plate 50 is a round plate shape in which powder is receivable along the outer wall of the oblique portion 40. The plate 50 is provided with a flat surface portion 51 which extends along an outer periphery of a lower end section of the oblique portion 40, and a groove portion 52 which is inverted from the flat surface portion 51 to a lower part thereof. The groove portion 52 is continuously provided around an entire circumference of the plate 50 and is formed to have a constant depth and a constant width. The plate 50 is also provided with a plurality of drop holes 53 extending in a circumferential direction thereof. Specifically, the drop holes 53 are provided on an inner side of the flat surface portion. Furthermore, the drop holes 53 can drop powder to a collection case 60 which is provided below the plate 50.

The plate 50 rotates around the axis by transmission of torque generated at a second motor 54 through the belt 55. It is noted that a configuration in which the second motor 54 is directly connected to the plate to operate may also be provided.

A rotating wing 61 provided below the plate 50 rotates with the plate 50 by torque generated at the second motor 54. The rotating wing 61 introduces the powder retrieved by the collection case 60 to a pump pathway 62. A pump 63 which can move the powder is provided on the pumping pathway 62. The powder which is introduced into the pump pathway 62 is moved back to the inside of the tank 10 by operation of the pump 63.

As shown in FIG. 1, the powder discharging member 70 is fixed to the lower side of the plate 50 using a metallic fixing member 71. As shown in FIG. 3, four powder discharging members 70 are provided in the circumferential direction of the plate 50. It is noted that a dot-dash line in FIG. 3 indicates a position in which the powder-discharging member 70 is provided. The powder discharging member 70 moves relative to the plate 50, by rotation of the plate 50. The plate 50 is rotated by operation of the second motor 54.

It is noted that the powder discharging members 70 are not limited to the number described herein above, and may be provided according to a requirement.

Figure 4:
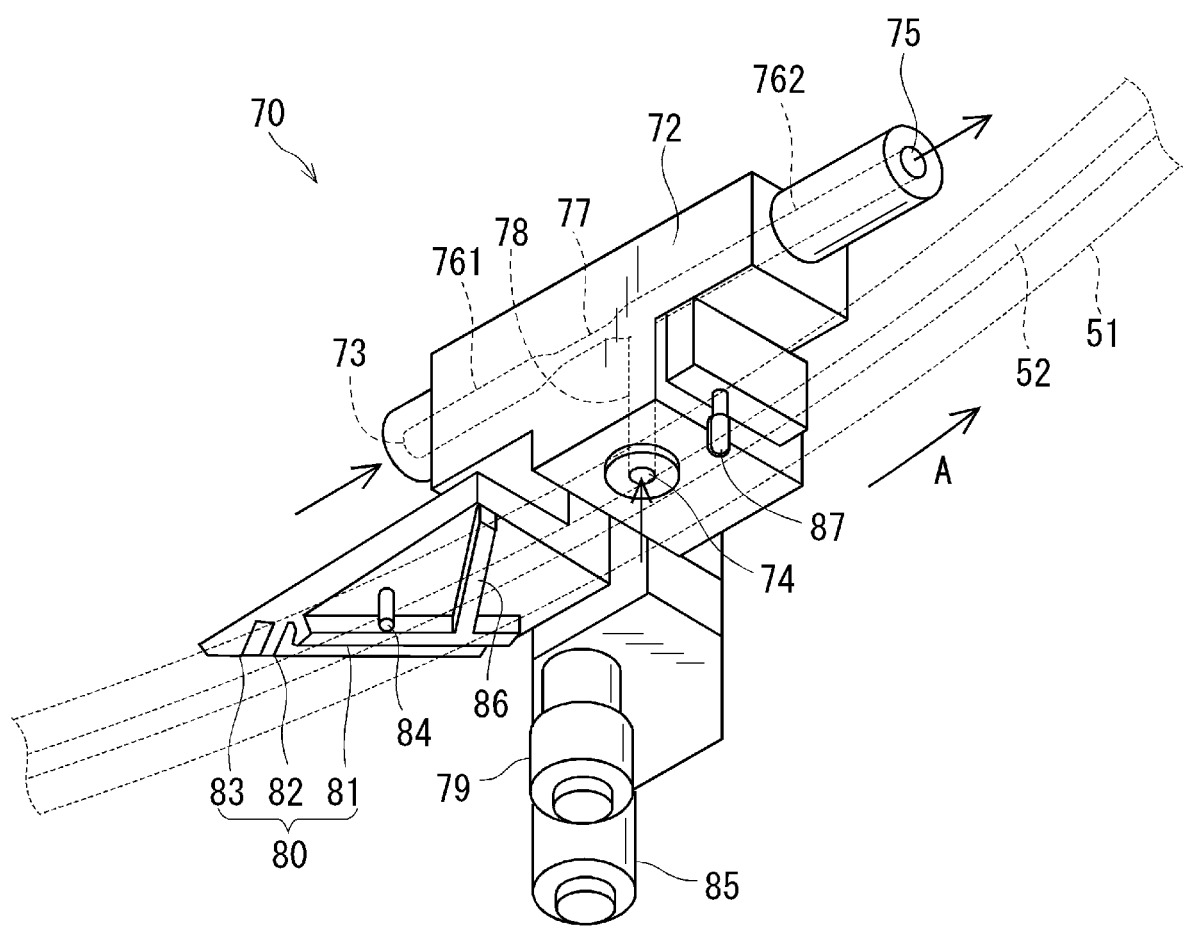
FIG. 4 is a view in a direction of an arrow IV of FIG. 1.
Figure 5:
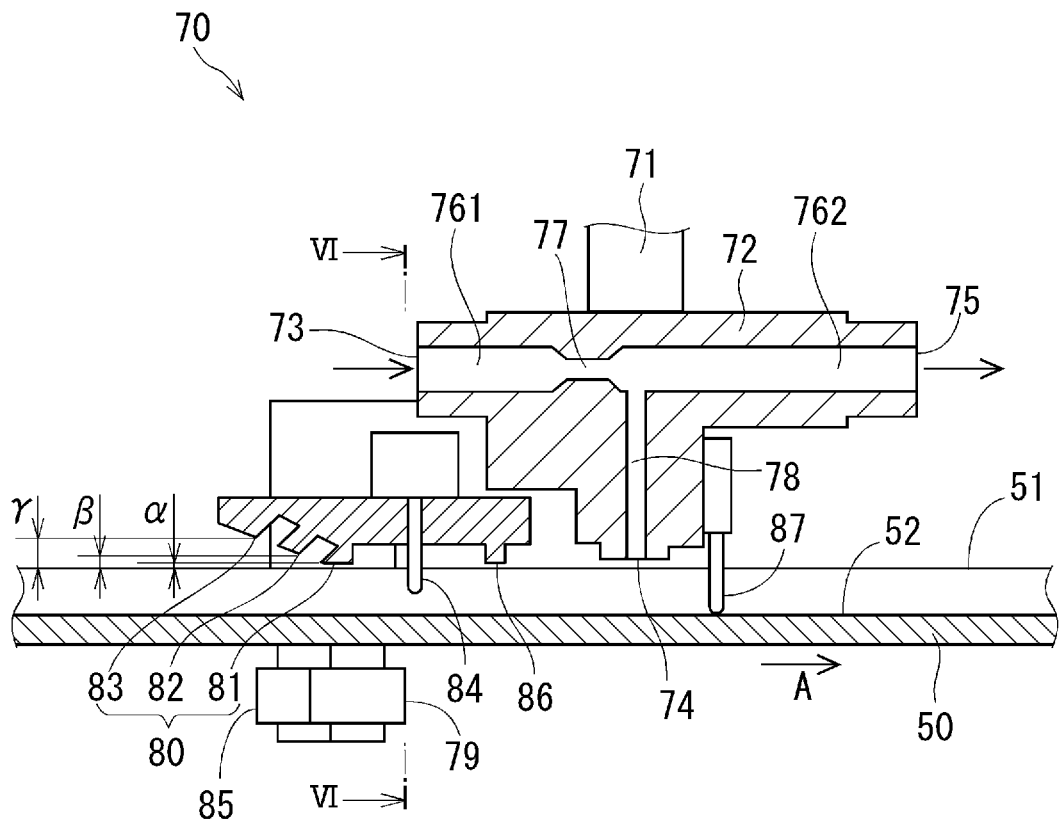
FIG. 5 is across sectional view along a line V-V of FIG. 1.
Figure 6:
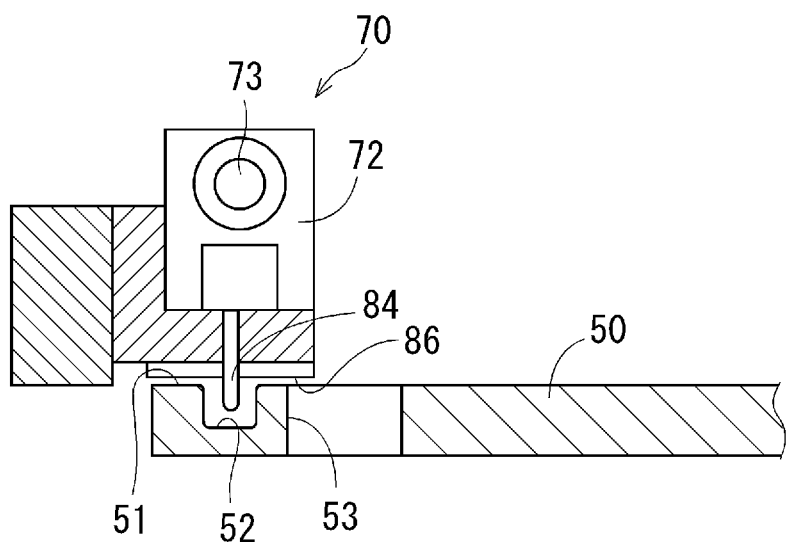
FIG. 6 is a cross sectional view along a line VI-VI of FIG. 5.

As shown in FIG. 4 to FIG. 6, the powder discharging members 7 are configured of an ejector 72, a scraper 80, an adjusting rod 84, a front scraper 86 and a groove scraper 87, for example. That is, the ejector 72, the scraper 80, the adjusting rod 84, the front scraper 86 and the groove scraper 87 which configure the powder discharging member 70 are moveable relative to the plate 50. As shown in FIG. 4 and FIG. 5, the relative moving direction of the plate 50 in relation to the scraper 80 is shown with an arrow A. Hereafter, this direction is referred to as [plate moving direction A].

In FIG. 4 it is noted that the flat surface portion 51 and the groove portion 52 are shown with a broken line.

The ejector 72 is equipped with a suction opening 73 positioned in a vicinity of a groove portion 52 of the plate 50, which takes in powder that has accumulated in the groove portion 52, and a discharge opening 75 which discharges the powder which has been taken in by the suction opening 74, in addition to discharging air introduced from an air-intake opening 73. An orifice 77 having a smaller cross sectional path flow area than the air intake entrance 73 is provided between a first flow path 761 and a second flow path 762 connecting the air opening 73 and the discharge opening 75. A third flow path 78 connects the orifice 77 and the suction opening 74. As a result, the ejector 72 takes in the powder surrounding the suction opening 74 from the suction opening 74 to the third flow path 78, by low pressure which is generated when air which is introduced from the air-intake opening 73 to the first flow path 761 passes through the orifice 77. This powder is discharged from the discharge opening 75 via the second flow path 762.

It is noted that a distance between the suction opening 74 of the ejector 72 and the flat surface portion 51 of the plate 50 is adjustable by using a first adjusting control 79.

The scraper 80 is provided in a position at a rear side of the suction opening 74 of the ejector 72, in the plate moving direction A. The scraper 80 moves powder that has accumulated to a higher level than a fixed height, on the flat surface portion 51 and the groove portion 52, to an outer side of the flat surface portion 51, by relative movement, in relation to the plate 50. The powder accumulated in the flat surface portion 51 and the groove portion 52 may be thus uniformly smoothed to a fixed height. As a result, the ejector 72 may then take in the powder which is smoothed to a constant height on the flat surface portion 51 and the groove portion 52 by the scraper 80.

A plurality of the scrapers 80 are provided in line in the plate moving direction A. In the first embodiment, a respective first scraper 81, second scraper 82 and third scraper 83 are provided is this order from a front side of the plate moving direction A. A distance α between the first scraper 81 and the flat surface portion 51 is shorter than a distance β between the second scraper 82 and the flat surface 51. The distance β between the second scraper 82 and the flat surface 51 is shorter than a distance γ between the third scraper 83 and the flat surface 51. That is, the plurality of scrapers 81, 82 and 83 are arranged such that a predefined scraper positioned at the front side, in the plate moving direction A, is closer to the flat surface portion 51 than other scrapers positioned at a rear side of the plate moving direction 50. As a result, the powder inside of the groove portion 52 is not compressed even when air forms in the powder contained inside the groove portion 52. Specifically, cavity spaces may be gradually buried and become smaller inside the powder.

Additionally, any one of the respective first, second and third scrapers 81, 82 and 83 is disposed to be oblique in relation to the plate moving direction A. As a result, powder which has accumulated to a height which is higher than a constant height on the flat surface 51 member and the groove portion 52, may be rapidly moved to the outer side of the flat surface portion 51 without being compressed.

It is noted that powder which is moved to the outside of the flat surface portion 51 is dropped into the collection case 60 from either the outer periphery of the plate 50 or the drop holes 53.

The adjusting rod 84 is provided between the suction opening of the ejector 72 and the scraper 80. The adjusting rod 84 is capable of reciprocating movement in a depth direction of the groove portion 52, and in doing so a cross sectional area of the groove portion 52 is adjustable. Additionally, a width of the adjusting rod 84 is formed to be substantially smaller than a width of the groove. As a result, the adjusting rod 84 scrapes out the powder from an inside of the groove portion 52 to the outside thereof, and can adjust the quantity of the powder inside the groove portion without the powder remaining inside the groove portion 52 becoming compressed.

It is noted that a depth in which the adjusting rod 84 is inserted inside the groove portion 52 is adjustable by a second adjustment control 85.

A front side scraper 86 is provided between the suction opening 74 of the ejector 72 and the adjusting rod 84. The front scraper 86 is also provided oblique in relation to the plate moving direction A. The front side scraper 86 can uniformly smooth the powder accumulated on the front surface member 51 and the groove portion 52 to a constant height. The powder which is scraped out of the groove portion 52 and into the flat surface portion 51 by the adjusting rod 84 is uniformly smoothed to a constant height using the front scraper 86.

A groove scraper 87 is provided on a front side of the plate moving direction A (on a side which opposes the scraper 80) relative to the suction opening 74 of the ejector 72. A width of the groove scraper 87 is formed to be considerably smaller than the width of the groove. The groove scraper 87 is inserted into a deep section of the groove portion 52 and fixed at that position. The groove scooper 87 can thus remove powder which has accumulated in the deep section of the groove portion 52.

As described hereinabove, the powder which is uniformly smoothed to a constant height on the flat surface portion 51 and the groove portion 52 by scraper 80 is then taken in by the suction opening 74 of the ejector 72, and discharged from the discharge opening 75. Four ejectors 72 which form four powder discharging members 70 are each provided with the disc2harge opening 75. A hose, that is, one hose is mounted in each discharge opening 75, hence a total of four hoses are provided. It is noted that a number of feeding discharge members 70 and hoses, for example, are not limited to the above described and may be optionally arranged.

Figure 7:
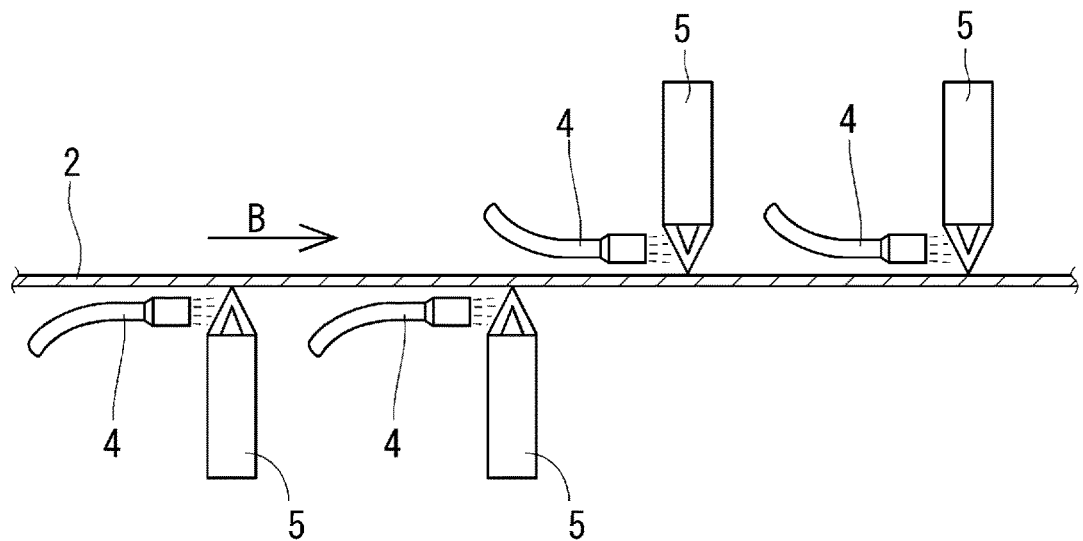
FIG. 7 is a schematic view of powder which is supplied from the powder feeding apparatus to a processing object.

As shown in FIG. 7, the four hoses 4 are provided towards the processing object, such that on a tip end of each hose 4 is positioned on a side which opposes the discharge opening 75 of the ejector 72. When the processing object 2 moves in a predetermined direction B, powder is supplied from four tip ends of the four hoses to the processing object 2. The powder supplied to the processing object is heated by a plasma spraying member 5 and spray welded to the processing object 2.

Next, a powder feeding method which is used for the powder feeding apparatus 1 according to the first embodiment will be described with reference to the flow chart shown in FIG. 8. The powder feeding method includes a storing step (S1), a speed adjustment step (S2), a groove capacity adjustment step (S3), a dropping step (S4), a cut and smoothing to uniform level step (S5) and a discharge step (S6), for example.

Figure 8:
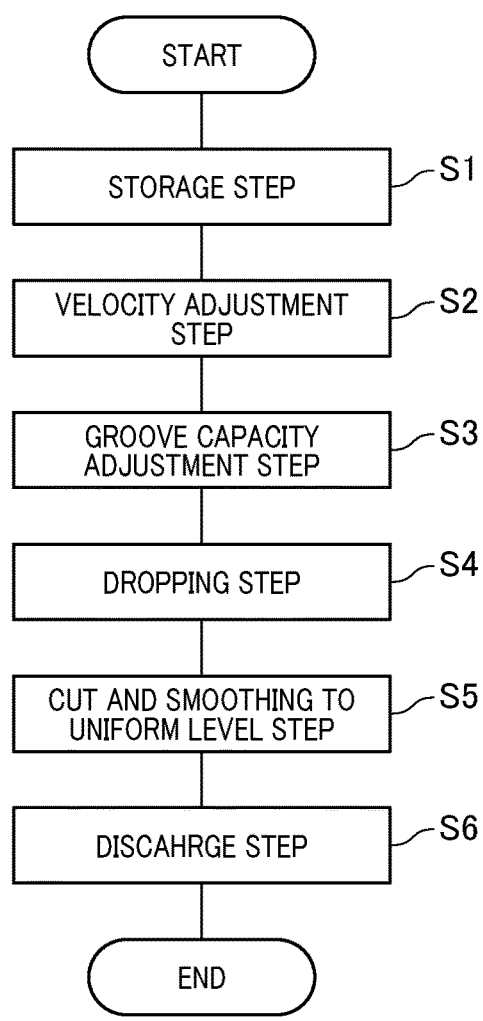
FIG. 8 is a flowchart of a feeding method according to the first embodiment.

An order of process steps in FIG. 8 is exemplified in such a manner merely for simplicity, and the actual steps described above may be simultaneously and continuously performed.

Firstly, in the storing step, the powder is supplied from the powder storage member 15 to the tank 10, and stored in the tank 10. Next, in the speed adjustment step (S2) a second monitor 54 is controlled and a rotating speed of the plate 50 is adjusted. Next, in the groove capacity adjustment step (S3), a depth into which the adjusting rod is inserted into the groove portion 52 is adjusted by the second adjustment control 85. Since a cross sectional area of the groove portion 52 is adjusted by adjusting the depth thereof, a volume of powder which is accumulated in the groove portion 52 is set.

It is noted that in the groove capacity adjustment step (S3), a depth into which each adjusting rod 84 is inserted into the groove portion 52 may be adjusted for each adjusting rod 84 provided for each one of the four powder discharging members 70. That is, the adjustment of the depth is individually adjusted for each of the adjusting rods 84. As a result, the quantity of powder taken in by each suction opening 74 of each of the four powder discharging members 70 is thus adjusted for each suction opening 74.

As described hereinabove, according to the speed adjustment step (S2) and the groove capacity adjustment step (S3), the ejector 72 intakes powder from the groove portion 52 of the plate 50 and a quantity of the powder per discharge time is set.

Next, in the dropping step (S4) a first motor 19 is operated. The first motor 19 and the shaft 18 rotate the board clip member 22, the first mixing rod 26 and the second mixing rod 27. Additionally, the vibration generator 32 is operated and the bottom board 11 is vibrated.

As a result, the board clip member 22 pushes out the powder inside the tank 10 from a mesh provided with the net section 17, the powder passes through the through holes 16 of the bottom board 11 and is dropped to the outer wall of the oblique member 40. The powder is dropped along the outer wall of the oblique portion 40 and is accumulated on top of the flat surface portion 51 and the groove portion 52.

Next, in the cut and smoothing to uniform level step (S5), the second motor 54 is operated and the plate 50 is rotated in relation to the powder discharging member 70.

The powder which accumulates to a higher level than a constant level on top of the flat surface portion 51 and the groove portion 52 is moved an outer-side of the flat surface portion 51 by the scraper 80 of the powder discharging member 70, by relative rotation of the scraper 80 of the powder discharging member 70, in relation to the plate 50. As a result, the powder which has accumulated on the flat portion 51 and the groove 52 is smoothed to a constant level in height. At this point, the powder which is moved to the outer side of the flat surface portion 51 by the scraper 80 is dropped from the outer periphery of the plate or the dropping hole 53 to the collection case 60.

Next, in the discharge step (S6), air is introduced into the suction opening 73 of the ejector 72, and the powder which is gathered in the groove portion 52 is taken-in from the suction opening 74, and is discharged with the air from the discharge opening 75. The powder which is discharged from the discharge opening 75 passes through the hose 4, attached to the discharge opening 75, and is supplied to the processing object.

It is noted that in the cut and smoothing to uniform level step (S5) described above, the powder which is dropped into the collection case 60 is passed through the pumping pathway 62 by the operation of the pump 63, and then returned to the inside of the tank 10. The controlling apparatus 14 supplies powder from the powder storage member 15 to the tank 10 when the amount of powder is lower than a fixed quantity inside the tank 10, based on signals of the sensor 13 which is disposed inside the tank.

The powder feeding apparatus 1 of the first embodiment elicits the following effects.

(1) The powder feeding apparatus according to the first embodiment uses the scraper 80 to move the powder which has accumulated on the flat surface portion 51 and the groove portion 52 to the outer-side of the flat surface portion 51. As a result, powder which has accumulated on the flat surface portion 51 and the groove portion 51 is uniformly smoothed to a constant height without compression of the powder, and powder inside the groove portion 52 is maintained at a constant density. The powder feeding apparatus 1 can thus take-in the powder from the suction opening 74 of the ejector 72, and discharge stable quantities of powder having only little difference between each quantity discharged from the discharge opening 75.

(2) The powder feeding apparatus 1 according to the present embodiment is equipped with the adjusting rod 84 which is capable of reciprocating movement in the depth direction of the groove portion 52, and a cross sectional area of the groove portion 52 is adjustable. As a result according to the powder feeding apparatus 1, the ejector 72 takes in powder from the suction opening 74 and the quantity of powder discharged from the discharge opening 75 may be adjusted.

(3) The powder feeding apparatus 1 according to the present embodiment is equipped with the front side scraper 86 provided between the suction opening 74 of the ejector 72 and the adjusting rod 84. According to this configuration, the powder which is scraped from the groove portion 52 to the flat surface portion 51, by the adjusting rod 84, may be uniformly smoothed to a constant height using the front side scraper 86.

(4) In the first embodiment, the scraper 80 is provided at an inclination in relation to the moving direction of the plate A. The scraper 80 can thus rapidly move the powder which accumulates to a higher level than the constant level on the flat surface portion 51 and the groove portion 52, to the outside of the flat surface portion 51, without compression thereof.

(5) According to the first embodiment, a distance between the scraper 80, disposed in a predetermined position at the front side, in the plate moving direction A, and the flat surface portion 51 is shorter than a distance between the scraper 80, disposed in the position at the rear side, in the plate moving direction A, and the flat surface portion 51. As a result, when a cavity forms in the powder which on the inner side of the groove portion 52, the cavity can be buried and made smaller in the powder. The powder on the inner side of the groove portion is therefore not compressed and may be kept at a substantially constant density.

(6) The powder feeding apparatus 1 of the first embodiment is equipped with the groove scraper 87 which removes powder which has accumulated in the deep section of the groove portion 52 from the groove portion 52. As a result, hardening of the powder remaining inside the groove portion which is not taken-in by the suction opening 74 of the ejector 72 may be prevented. The powder feeding apparatus 1 can thus take-in powder from the suction opening 74 of the ejector 72, and discharge stable quantities of the powder from the discharge opening 75, with little differences in discharged quantities.

(7) The powder feeding apparatus 1 of the first embodiment is equipped with the drop holes 53 on the inner side of the flat surface portion 51, in the radial direction, into which powder is dropped from the plate 50. As a result, powder is prevented from remaining on the inner side in the radial direction of the flat surface portion 51. Furthermore, compression of the powder can also be prevented when powder is moved from the flat surface portion 51 by the scraper 80.

(8) In the first embodiment, the plurality of the powder discharging members are provided in the circumferential direction of the plate 50. According to this configuration, powder can be discharged on to a plurality of locations of the processing object 2, from the plurality of powder discharging members 70.

(9) In the first embodiment, each of the plurality of powder discharging members 70 has the groove scraper 87. As a result, the powder remaining on the inner side of the groove portion which is not taken into the suction opening 74 of the ejector 72 provided on a predetermined powder discharging member 70, may be thus prevented from being taken into other suction openings 74 of the ejectors 72 which are disposed at the front side, in the moving plate direction A. According to the powder feeding apparatus 1 described, powder which is taken in from the suction openings 74 of the ejectors 72 of the plurality of powder discharging members 70, and then discharged from the discharge openings 75 may be discharged at stables quantities. That is, the powder may be discharged with only small differences between each quantity.

(10) In the first embodiment, the plate spring member 22 is in contact with the net section 17 on the inside of the tank 10, and also moveable on top of the net section 17. According to the configuration, since the powder inside the tank 10 passes through the network of the net section 17, lumps of powder dropping can be prevented. Furthermore, the powder on the plate 50 can be accumulated at a constant density. Powder which has substantially constant density may thus be accumulated at the inner side of the groove portion 52. Additionally, if the network of the net section 17 is intricate, constant stable quantities of powder can be dropped from the network of the net section 17 through the through holes 16 of the bottom board 11, by operation of the board clip member 22.

(11) The powder feeding apparatus 1 of the first embodiment has the vibration generator 32 which vibrates the bottom board 11. Formation of lumps in the powder on the inner side of the through holes 16 of the bottom board is thus prevented by the vibrations. Furthermore, stable quantities of powder can be dropped from the network of the net section 17 through the through holes 16 of the bottom board 11.

(12) The powder feeding apparatus 1 of the first embodiment is equipped with the first rod mixer 26 and the second rod mixer 27 each of which mix inside the tank 10. As a result, differences between quantities of powder which are dropped from the through holes 16 provided in the plurality of locations on the bottom board is suppressed.

Following effects are obtained from the powder feeding method of the first embodiment.

(13) The powder feeding method of the first embodiment includes the scraper 80 moving powder which has accumulated on the flat surface portion 51 and the groove portion 52, to the outer side of the flat surface portion 51, during the cut and smoothing to uniform level step (S5). The powder accumulated on top of the flat surface portion 51 and the groove portion 52 is thus uniformly smoothed to a constant height without compression thereof, and powder on the inner side of the groove portion 52 is maintained at a substantially constant density. Furthermore, according to this powder feeding method, the ejector 72 can take-in constant quantities of powder from the suction opening 74, and then discharge stable quantities of powder from the discharge opening 75.

(14) The powder feeding method of the first embodiment includes the speed adjustment step (S2) in which the speed of the relative movement of the plate 50 and the ejector 72 is adjusted. According to the configuration, the quantity of powder taken-in from the suction opening 74 of the ejector 72 and discharged from the discharge opening 75 can be adjusted.

(15) The powder feeding method according to the first embodiment includes the groove capacity adjustment step (S3) in which the insertion depth of the adjusting rod 84 into the groove portion 52 is adjusted. The quantity of powder taken-in from the suction opening 74 of the ejector 72 and discharged from the discharge opening 75 can be thus adjusted.

(16) The powder feeding method according to the first embodiment has the plurality of the powder discharging members 70 each provided with the adjusting rod. Specifically, in the groove capacity adjustment step (S3), an insertion depth of the groove portions 52 is each individually adjusted by each of the adjusting rods 84. According to the groove capacity adjustment step (S3), a quantity of the powder which is discharged from each discharge opening 75 of the powder discharging members 70 can be individually adjusted.

Other Embodiments (1) As described hereinabove, the powder feeding apparatus 1 is equipped with four powder-discharging members. In other embodiments, the powder feeding apparatus 1 may also be equipped with one or an optional number of powder discharging-members accordingly.

(2) As described in the embodiment hereinabove, the powder feeding apparatus 1 supplies a flux-powder used for thermal spraying of a metallic board material. However, in this regard, the feeding apparatus 1 according to the other embodiments may supply other powders, for example, resin or various ceramic powders, to various processing objects 2.

(3) The embodiments above describe the powder-discharging apparatus 70 fixed to the bottom board 11 and a plate 50 configured to rotate in relation to the powder-discharging apparatus 70. In this regard, according to the other embodiments, a configuration in which the plate 50 is fixed and the powder discharging member 70 rotates in the circumferential direction of the plate 50 may also be provided. In this configuration, the powder discharge section 70 and the plate 50 move relative to each other.

(4) The powder feeding apparatus 1 is configured such that torque generated by the first motor 19 is transmitted to the shaft 18 via the belt 20. In this regard, a configuration in which the first motor 19 is directly connected to the shaft 18 to be operated may be provided for the other embodiments.

(5) As described in the embodiment above, torque which is generated at the second motor 54 is transmitted to the plate 50 via the belt 55. In this regard, a configuration in which the operation of the second motor 54 is directly connected to the plate 50 may also be employed in the other embodiments.

The present invention is not limited to embodiments described hereinabove and various other modes which do not depart from the essence of the invention may also be embodied.

REFERENCE SYMBOL LIST

1 . . . powder feeding apparatus
10 . . . tank
11 . . . bottom board
40 . . . oblique portion
50 . . . plate
51 . . . flat surface portion
52 . . . groove portion
72 . . . ejector
74 . . . suction opening
75 . . . discharge opening
80 . . . scraper

What is claimed is:

1. A powder feeding apparatus comprising;
a tank having a bottom and storing powder on an inside;
a bottom board disposed on the bottom of the tank provided with a through hole into which the powder passes through, the bottom board having a lower side;
an oblique portion provided on the lower side of the through hole of the bottom board, such that an outer radius of the oblique portion gradually increases away from a bottom side of the plate, the oblique portion having a lower-end and an outer wall;
a plate having a flat surface portion extending along an outer periphery of the lower-end of the oblique portion, and a groove portion formed in the flat surface portion, the plate receiving powder which drops along the outer wall of the oblique portion;
a scraper relatively movable in relation to the plate, moving powder which has accumulated on top of the flat portion and the groove to a higher level than a constant level, the scraper moving the powder to an outer side of the flat surface portion, and uniformly smoothing a height of the powder accumulated on the flat surface portion and the groove portion to the constant level; and
an ejector provided with a suction opening positioned at a front-side of the scraper, in a relative moving direction of the plate, in relation to the scraper, and a discharge opening discharging powder taken in from the suction opening, wherein the suction opening takes in powder which has accumulated on the groove portion of the plate; and the ejector is moveable relative to the scraper and the plate.

2. The powder feeding apparatus according to claim 1, further comprising:
an adjusting rod capable of adjusting a cross sectional area of the groove portion, wherein the adjusting rod is moveable between the suction opening of the ejector and the scraper, in relation to the plate, and capable of reciprocating movement in a depth direction of the groove portion.

3. The powder feeding apparatus according to claim 2, further comprising:
a front-side scraper which is moveable between the suction opening of the ejector and the adjusting rod, in relation to the plate, and levels a height of the powder accumulated on top of the flat surface and the groove portion, uniformly to the constant level.

4. The powder feeding apparatus according to claim 3, wherein the ejector and the scraper form a feeding discharge section, and the feeding discharge section is provided in plurality, in a circumferential direction of the plate.

5. The powder feeding apparatus according to claim 2, wherein the ejector and the scraper form a feeding discharge section, and the feeding discharge section is provided in plurality, in a circumferential direction of the plate.

6. The powder feeding apparatus according to claim 2, wherein the scraper is obliquely arranged in relation to the relative moving direction of the scraper and the plate.

7. The powder feeding apparatus according to claim 2, wherein the scraper is provided in plurality, the plurality of scrapers are arranged along the relative moving direction of the scraper and the plate, and a first distance between a predetermined scraper positioned at a front side of the moving direction of the plate in relation to the scraper and the flat surface portion is shorter than a second distance between another predetermined scraper positioned at a rear side of the moving direction of the plate in relation to the scraper and the flat surface portion.

8. The powder feeding apparatus according to claim 2, further comprising
a groove scraper provided on a side which opposes the scraper, in relation to the suction opening of the ejector, wherein the groove scraper is inserted into the groove portion and eliminates powder which has accumulated in a deep portion of the groove portion.

9. The powder feeding apparatus according to claim 2, wherein the flat surface portion has an inner side and the plate has a circular-plate shape and a dropping hole into which the powder is dropped onto a radial inner side of the flat surface portion.

10. The powder feeding apparatus according to claim 1, wherein the scraper is obliquely arranged in relation to the relative moving direction of the scraper and the plate.

11. The powder feeding apparatus according to claim 1, wherein the scraper is provided in plurality, the plurality of scrapers are arranged along the relative moving direction of the scraper and the plate, a first of the plurality of scrapers positioned in the moving direction forward of a second of the plurality of scrapers, and a first distance between the first scraper and the flat surface portion is shorter than a second distance between the second of the plurality of scrapers and the flat surface portion.

12. The powder feeding apparatus according to claim 1, further comprising
a groove scraper provided on a side of the suction opening of the ejector which opposes the scraper, in relation to the suction opening of the ejector, wherein the groove scraper is inserted into the groove portion and eliminates powder which has accumulated in a deep portion of the groove portion.

13. The powder feeding apparatus according to claim 1, wherein the flat surface portion has an inner side and the plate has a circular-plate shape and a dropping hole into which the powder is dropped onto a radial inner side of the flat surface portion.

14. The powder feeding apparatus according to claim 1, further comprising
a net portion provided above the through hole of the bottom board, and a plate spring member in sliding contact on the net portion inside of the tank, the plate spring member being moveable on the net portion.

15. The powder feeding apparatus according to claim 1, further comprising
a vibration generator which vibrates the bottom board.

16. The powder feeding apparatus according to claim 1, further comprising
a mixing rod for mixing powder inside the tank, the mixing rod being moveable inside the tank.

17. A powder feeding method including:
a storage step for storing powder in a tank;
a dropping step for dropping the powder from through holes of a bottom board provided on a bottom of the tank, to an outside wall of an oblique portion, provided at a lower side of the through holes;
a cut and smoothing to uniform level step for cut and smoothing the powder which has been dropped along the outside wall of the oblique portion and has accumulated to a higher level than a fixed height on a flat surface portion and a groove portion of a plate by a scraper; the scraper moving the powder to an outside of the flat surface portion, and smoothing the powder on the flat surface portion and the groove portion uniformly, to the fixed height; and
a discharge step for discharging powder from a discharge opening, by relatively moving of the plate and an ejector, and sucking the accumulated powder in the groove portion of the plate into a suction opening of the ejector; and discharging the powder from a discharge opening.

18. The powder feeding method according to claim 17, further including
a speed adjustment step for adjusting a speed of the relative movement of the plate and the ejector.

19. The powder feeding method according to claim 17, including
a groove capacity adjustment step for adjusting a depth into which an adjustment rod is inserted into the groove portion, the adjustment rod being capable of reciprocating movement in a depth direction of the groove portion which is provided between the suction opening of the ejector and the scraper.

20. The powder feeding method according to claim 19, wherein the ejector, the scraper and the adjusting rod are included in a powder discharge section,
the powder discharger section is provided in plurality in a circumferential direction of the plate, the groove capacity adjustment step adjusts the depth into which each adjusting rod is inserted into the groove portion, and the plurality of the powder-discharge sections are provided with the adjusting rods.

* * * * *